United States Patent
Wise et al.

(10) Patent No.: US 9,352,741 B2
(45) Date of Patent: May 31, 2016

(54) METHOD AND APPARATUS FOR CONTROLLING CREEP TORQUE IN A POWERTRAIN SYSTEM

(71) Applicant: GM GLOBAL TECHNOLOGY OPERATIONS LLC, Detroit, MI (US)

(72) Inventors: Jeremy Wise, Novi, MI (US); Jy-Jen F. Sah, West Bloomfield, MI (US); Anthony H. Heap, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 358 days.

(21) Appl. No.: 13/967,467

(22) Filed: Aug. 15, 2013

(65) Prior Publication Data

US 2015/0051046 A1    Feb. 19, 2015

(51) Int. Cl.

| | |
|---|---|
| *B60W 10/184* | (2012.01) |
| *B60W 20/00* | (2016.01) |
| *B60K 6/387* | (2007.10) |
| *B60K 6/445* | (2007.10) |
| *B60W 10/105* | (2012.01) |
| *B60W 30/18* | (2012.01) |

(52) U.S. Cl.
CPC .............. *B60W 10/184* (2013.01); *B60K 6/387* (2013.01); *B60K 6/445* (2013.01); *B60W 10/105* (2013.01); *B60W 20/00* (2013.01); *B60W 30/18063* (2013.01); *B60W 2510/18* (2013.01); *B60W 2710/0666* (2013.01); *B60W 2710/083* (2013.01); *B60W 2710/18* (2013.01); *Y02T 10/6239* (2013.01); *Y10S 903/902* (2013.01); *Y10T 477/33* (2015.01)

(58) Field of Classification Search
None
See application file for complete search history.

(56) References Cited

U.S. PATENT DOCUMENTS

| | | | |
|---|---|---|---|
| 4,735,113 A | 4/1988 | Yamamuro et al. | |
| 6,146,308 A | 11/2000 | Taniguchi et al. | |
| 6,278,916 B1 | 8/2001 | Crombez | |
| 6,338,398 B1 * | 1/2002 | Eguchi ................... | B60K 6/485 137/598 |
| 2007/0050120 A1 * | 3/2007 | Tabata ..................... | B60K 6/44 701/80 |
| 2009/0114468 A1 | 5/2009 | Schwarz et al. | |
| 2012/0150384 A1 * | 6/2012 | Jung ............... | B60W 30/18063 701/31.1 |

OTHER PUBLICATIONS

U.S. Appl. No. 13/705,938, filed Dec. 5, 2012, Wise, Unpublished.
U.S. Appl. No. 13/624,045, filed Sep. 21, 2012, Heap, Unpublished.

* cited by examiner

*Primary Examiner* — Justin Holmes (57) ABSTRACT

A vehicle includes an internal combustion engine coupled to an input member of a multi-mode transmission configured to transfer torque to an output member coupled to a ground wheel with the internal combustion engine in an ON state generating an input torque. A method for controlling the vehicle includes identifying an undesirable operating region including an input/output torque region for operating the multi-mode transmission. In response to an operator request for creep torque, motor torque is controlled from a torque machine coupled to the multi-mode transmission such that the multi-mode transmission is operating outside the undesirable operating region while a mechanical braking torque to the ground wheel is coincidentally controlled in response to an operator-commanded braking, the input torque from the engine, and the motor torque from the torque machine.

12 Claims, 3 Drawing Sheets

METHOD AND APPARATUS FOR CONTROLLING CREEP TORQUE IN A POWERTRAIN SYSTEM

TECHNICAL FIELD

This disclosure is related to dynamic system controls associated with powertrain systems employing multiple torque-generative devices.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A vehicle includes an internal combustion engine coupled to an input member of a multi-mode transmission configured to transfer torque to an output member coupled to a ground wheel with the internal combustion engine in an ON state generating an input torque. A method for controlling the vehicle includes identifying an undesirable operating region including an input/output torque region for operating the multi-mode transmission. In response to an operator request for creep torque, motor torque is controlled from a torque machine coupled to the multi-mode transmission such that the multi-mode transmission is operating outside the undesirable operating region while a mechanical braking torque to the ground wheel is coincidentally controlled in response to an operator-commanded braking, the input torque from the engine, and the motor torque from the torque machine.

BRIEF DESCRIPTION OF THE DRAWINGS

One or more embodiments will now be described, by way of example, with reference to the accompanying drawings, in which.

DETAILED DESCRIPTION

Figure 1:
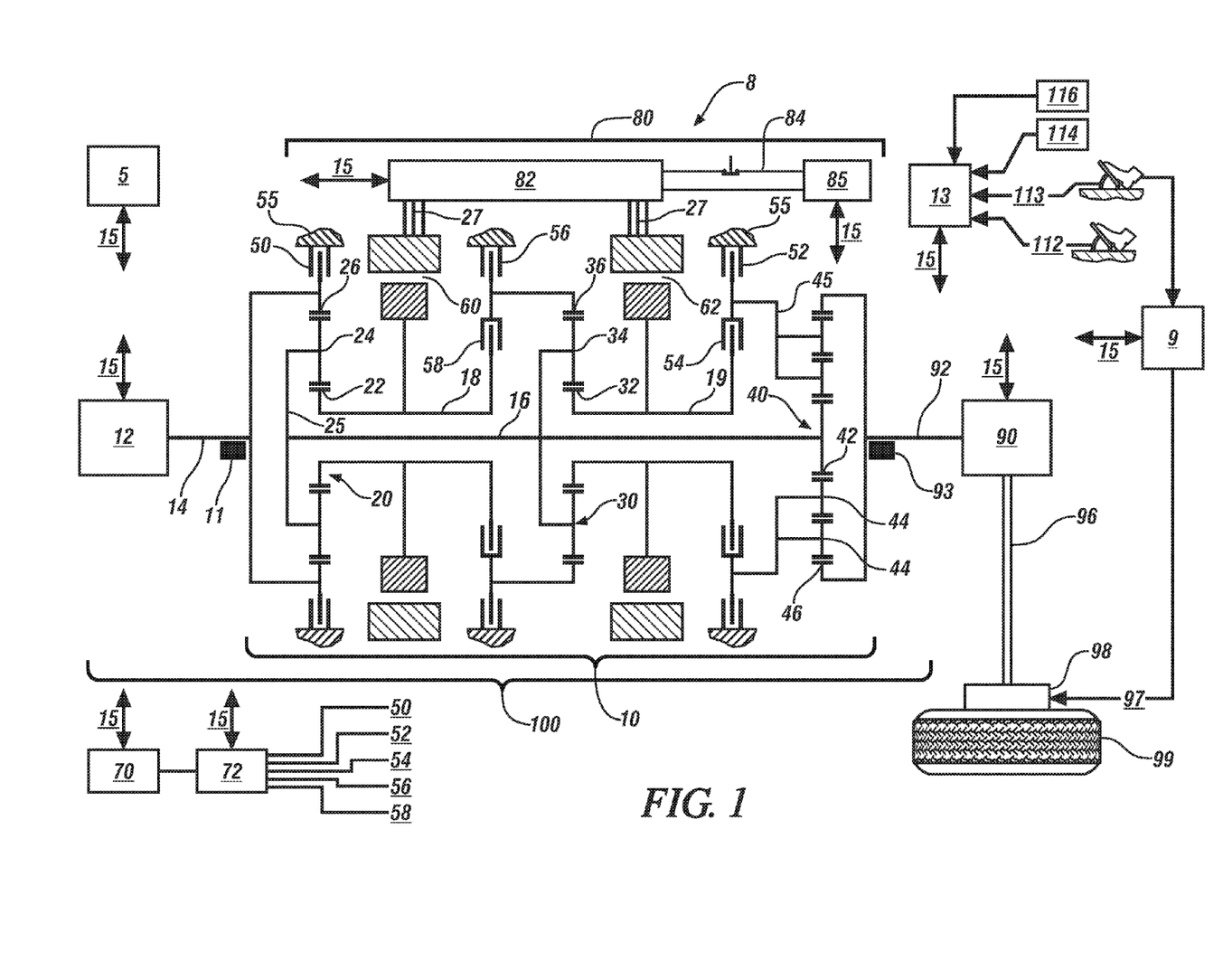
FIG. 1 illustrates an embodiment of a powertrain system including an internal combustion engine, multi-mode transmission, and a driveline configured with a rear-wheel drive differential, in accordance with the disclosure.

Referring now to the drawings, wherein the showings are for the purpose of illustrating certain exemplary embodiments only and not for the purpose of limiting the same, FIG. 1 depicts a non-limiting embodiment of a vehicle 8 including a powertrain system 100 configured to transfer tractive torque to one or more ground wheels 99 for propulsion. The powertrain system 100 includes an internal combustion engine (engine) 12, a multi-mode transmission (transmission) 10, a high-voltage electrical system 80, a driveline 90, and a controller 5. The transmission 10 mechanically couples to torque generators including the engine 12 and first and second torque machines 60 and 62, respectively, and is configured to transfer torque between the engine 12, the torque machines 60, 62, and the driveline 90. As illustrated, the first and second torque machines 60, 62 are electric motor/generators. The driveline 90 includes a differential system that couples via an axle 96 to one or more of the ground wheels 99, and is characterized by a final drive ratio that provides torque multiplication to the driven ground wheels. In one embodiment, the driveline 90 is configured in a rear-wheel drive arrangement. Alternatively, the driveline 90 can be configured to operate in a front-wheel drive arrangement, an all-wheel drive arrangement, a four-wheel drive arrangement, or another arrangement without limitation.

The high-voltage electrical system 80 includes an electrical energy storage device, e.g., a high-voltage battery (battery) 85 electrically coupled to a transmission power inverter control module (TPIM) 82 via a high-voltage electrical bus 84, and is configured with suitable devices for monitoring electric power flow including devices and systems for monitoring electric current and voltage. The battery 85 can be any suitable high-voltage electrical energy storage device, e.g., a high-voltage battery, and preferably includes a monitoring system that provides a measure of electrical power supplied to the high-voltage electrical bus 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., engine speed and engine torque, can differ from input speed and input torque to the transmission 10 due to placement of torque-consuming components on the input member 14 between the engine 12 and the transmission 10, e.g., a torque management device or a mechanically-powered hydraulic pump. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The exemplary transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. The transmission 10 couples to first and second torque machines 60 and 62, respectively, and is configured to transfer torque among the engine 12, the torque machines 60, 62, and the output member 92 in response to an output torque request. The first and second torque machines 60, 62 in one embodiment are motor/generators that employ electric energy to selectively generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other suitable methods.

The first and second torque machines 60 and 62 are three-phase AC motor/generator machines, each including a stator, a rotor, and a position sensor, e.g., a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the TPIM 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 rotatably connects to the driveline 90 to provide output power to the driveline 90 that is transferred to one or a plurality of the ground wheels 99 via differential gearing for example. The output power at the output member 92 is characterized in terms of an output rotational speed and an output torque. A transmission output speed sensor 93 monitors rotational speed and rotational direction of the output member 92. Each of the ground wheels 99 is preferably equipped with a sensor configured to monitor wheel speed to determine vehicle speed, and absolute and relative wheel speeds for braking control, traction control, and vehicle acceleration management. Each ground wheel 99 is preferably equipped with a controllable mechanical wheel brake 98 that can be any suitable configuration, e.g., a disc-brake configuration. Each wheel brake 98 applies a magnitude of mechanical brake torque 97 for resisting rotation of the corresponding ground wheel 99, wherein a brake controller 9 commands the magnitude of mechanical brake torque 97 in response to an operator-commanded braking force 113. The magnitude of mechanical brake torque 97 can directly correspond to the operator-commanded braking force 113. Alternatively, the magnitude of mechanical brake torque 97 can be responsive to the operator-commanded braking force 113 taking into account an electrical brake torque induced in the driveline 90 through the output member 92 due to electrically-induced reactive torque from one or both of the first and second torque machines 60, 62. The electrically-induced reactive torque from one or both of the first and second torque machines 60, 62 may be associated with regenerative braking.

The input torque from the engine 12 and the motor torques from the first and second torque machines 60, 62 are generated as a result of energy conversion from fuel or electrical potential stored in the battery 85. The battery 85 is high voltage DC-coupled to the TPIM 82 via the high-voltage electrical bus 84 that preferably include a contactor switch that permits or prohibits flow of electric current between the battery 85 and the TPIM 82. The TPIM 82 preferably includes a pair of power inverters and respective motor control modules configured to receive torque commands and control inverter states therefrom for providing motor drive or electric power regeneration functionality to meet the motor torque commands. The power inverters include complementary three-phase power electronics devices, and each includes a plurality of insulated gate bipolar transistors (IGBTs) for converting DC power from the battery 85 to AC power for powering respective ones of the first and second torque machines 60 and 62, by switching at high frequencies. The IGBTs form a switch mode power supply configured to receive control commands. Each phase of each of the three-phase electric machines includes a pair of IGBTs. States of the IGBTs are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the battery 85 to charge and discharge the battery 85.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of battery 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. The controller 5 signally connects to the brake controller 9 via communications link 15 for coordinating operational control of vehicle braking as described herein. A user interface 13 is preferably signally connected to a plurality of devices through which a vehicle operator directs and commands operation of the powertrain system, including commanding an output torque request and selecting a transmission range. A vehicle operator directs and commands operation of the powertrain system, including an operator-commanded acceleration 112 input from an accelerator pedal, the operator-commanded braking force 113 input from a brake pedal, an operator-commanded transmission range 114 input from a transmission range selector (PRNDL), and an operator-commanded vehicle speed 116 input from a cruise control system. The operator-commanded acceleration 112 input from the accelerator pedal can range from a 0% level indicating no operator input to the accelerator pedal to a 100% level indicating a maximum operator input to the accelerator pedal, which an operator request for maximum output power from the powertrain system often referred to as a wide-open throttle (WOT) maneuver. The operator-commanded braking force 113 can range from a 0% level indicating no operator input to the brake pedal to a 100% level indicating an operator input to the brake pedal commanding a braking torque up to a maximum achievable braking torque that is required to achieve zero vehicle speed. The transmission range selector preferably provides for operator-selectable transmission ranges associated with effecting vehicle propulsion, e.g., R, D, and L, and operator-selectable transmission ranges associated with decoupling the torque generators including the engine 12 and first and second torque machines 60 and 62 from the output member 92, e.g., P and N. The transmission range selector may provide for a discrete number of operator-selectable transmission ranges indicating an operator-intended direction of travel of the vehicle of either a forward or a reverse direction, thus indicating a preferred rotational direction of the output member 92. It is appreciated that the vehicle may still move in a direction other than the indicated direction of operator-intended motion due to rollback caused by location of a vehicle, e.g., on a hill. The operator-selectable positions of a transmission range selector can correspond directly to individual transmission ranges described with reference to Table 1, or may correspond to subsets of the transmission ranges described with reference to Table 1. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals referred to as loop cycles, for example each 100 microseconds and 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of transmission ranges and engine states to generate and transfer torque to the driveline 90. The engine states include an ON state and an OFF state. The engine is considered to be in the ON state when the engine is spinning. The engine ON state may include an all-cylinder state (ALL) wherein all cylinders are fueled and firing to generate torque, and a cylinder-deactivation state (DEAC) wherein a portion of the cylinders are fueled and firing to generate torque and the remaining cylinders are unfueled, not firing, and not generating torque. The engine ON state further includes a fuel cutoff (FCO) state, wherein all of the cylinders are unfueled, not firing, and not generating torque. When the engine is in the OFF state, it is not spinning Operating with the engine in the OFF state can be accomplished by grounding rotation of the input member to the transmission case using a clutch or similar device. By way of example, the powertrain system 100 of FIG. 1 can operate with the engine 12 in the OFF state, i.e., not spinning by activating clutch C5 50 to ground rotation of the input member 14 to the transmission case 55 with speeds of the first and second torque machines 60, 62 controlled to achieve an output speed and output torque that are responsive to the output torque request. Alternatively or in addition, operating with the engine in the OFF state can be accomplished by controlling rotational speeds of the torque machines to achieve an input speed that is zero and an output speed and output torque that are responsive to the output torque request. The output torque request includes a positive output torque request leading to vehicle acceleration and/or steady-state cruising operation. When the engine operates in the FCO state, the engine is spinning but is unfueled and not firing. The engine can operate in the FCO state in response to an operator command for vehicle deceleration, such as occurs when an operator lifts his foot from the accelerator pedal, referred to herein as a decel-fuel cutoff state (dFCO). The engine can be commanded to operate in the FCO state under other non-deceleration operating conditions.

The transmission ranges include a plurality of neutral (neutral), fixed gear (Gear #), variable mode (EVT Mode #), electric vehicle (EV #) and transitional (EV Transitional Range# and Pseudo-gear #) ranges that are achieved by selectively activating the clutches C1 50, C2 52, C3 54, C4 56, and C5 58. The pseudo-gear ranges are variable mode transmission ranges in which magnitude of torque output from the transmission to the driveline correlates to magnitude of the engine input torque, taking into account torque losses associated with torque-consuming components on the input member 14. The pseudo-gear range(s) can be employed as intermediate transmission ranges during shifts between EVT Mode ranges, and can also be employed as steady-state transmission operating states. Table 1 depicts a plurality of transmission ranges and engine states for operating the powertrain 100, wherein "x" indicates an activated clutch for the corresponding transmission range.

TABLE 1

| Range | Engine State | C1 | C2 | C3 | C4 | C5 |
|---|---|---|---|---|---|---|
| Neutral 1 | ON | | | | | |
| Neutral 2 | ON(ALL/DEAC/dFCO) | | x | | | |
| Neutral 3 | ON(ALL/DEAC/dFCO) | | | x | | |
| Pseudo-gear 1 | ON(ALL/DEAC/dFCO) | x | | | | |
| Pseudo-gear 2 | ON(ALL/DEAC/dFCO) | | x | | | |
| Neutral | OFF | | | | | x |
| EVT Mode 1 | ON(ALL/DEAC/dFCO) | x | | x | | |
| EVT Mode 2 | ON(ALL/DEAC/dFCO) | x | | | x | |
| EVT Mode 3 | ON(ALL/DEAC/dFCO) | | | x | x | |
| EVT Mode 4 | ON(ALL/DEAC/dFCO) | | | | x | x |
| EV Transitional State 1 | OFF | x | | | | x |
| EV Transitional State 2 | OFF | | x | | | x |
| Gear 1 | ON(ALL/DEAC/dFCO) | x | | x | x | |
| Gear 2 | ON(ALL/DEAC/dFCO) | x | x | | x | |
| Gear 3 | ON(ALL/DEAC/dFCO) | | | x | x | x |
| EV1 | OFF | x | | x | | x |
| EV2 | OFF | x | | | x | x |
| EV3 | OFF | | | x | x | x |
| EV4 | OFF | | | x | x | x |
| EV Transitional State 3 | OFF | x | x | | | x |
| Neutral | OFF | | | x | x | |
| Pseudo-gear 3 | ON(ALL/DEAC/dFCO) | x | x | | | |
| Neutral | OFF | | | x | | x |
| Neutral | OFF | | | | x | x |

The vehicle of FIG. 1 is controlled in response to operator commands under various operating conditions to transfer torque to an output member coupled to a ground wheel. This can include identifying an undesirable operating region for the multi-mode transmission including an input torque range and an output torque range associated with driveline growl. In response to an operator request for creep torque when the internal combustion engine in an ON state and generating an input torque, one of the torque machines can be controlled such that the multi-mode transmission is operating outside the undesirable operating region and a mechanical braking torque to the ground wheel is controlled responsive to the operator-commanded braking and the output torque of the multi-mode transmission.

Vehicle creep is a vehicle operating condition wherein the operator-commanded transmission range 114 is one of the operator-selectable transmission ranges associated with effecting vehicle propulsion in either a forward gear range (e.g., D or drive) or a reverse gear range (e.g., R or reverse), the operator-commanded acceleration 112 is at or near zero, e.g., an accelerator pedal position that is less than 5% to allow for errors associated with pedal sensor debounce, and the operator-commanded braking force 113 is some value between 0% and 100% of the braking force required to maintain the vehicle in a stationary position. When the braking force 113 is some value less than 100% some driveline torque is permitted to propel the vehicle, albeit at a lower rate of acceleration, i.e., a lower torque and a lower speed. An operator request for creep torque is induced when all of the aforementioned conditions are met. The operator request for creep torque translates to a torque command output from the powertrain to the driveline, with a maximum torque command sufficient to propel the vehicle to a maximum vehicle speed under known conditions such as the vehicle being on a level, smooth road surface. A maximum vehicle speed imposed by a vehicle controller under a vehicle creep condition can be 8 km/h (5 MPH), and a corresponding maximum output creep torque of 150 Nm. A creep torque includes torque generated by the powertrain system under such conditions. A powertrain system such as that of FIG. 1 can effect vehicle creep operation with the engine in either the ON state or the OFF state. The powertrain system may operate with the engine in the ON state under vehicle creep condition in response to other powertrain system needs or requirements, including operating the engine to effect battery charging or operating the engine to effect warm-up of exhaust emission components. A multi-mode transmission composed of high inertia components and planetary gear sets can be susceptible to objectionable driveline noise and vibration in certain regions of operation, which can be defined in terms of rotational speeds, including the input speed and the output speed. Vehicle launch and vehicle creep can cause a multi-mode transmission to enter such a region of operation including under conditions when the engine is in the ON state and generating tractive or propulsion torque.

Figure 2:
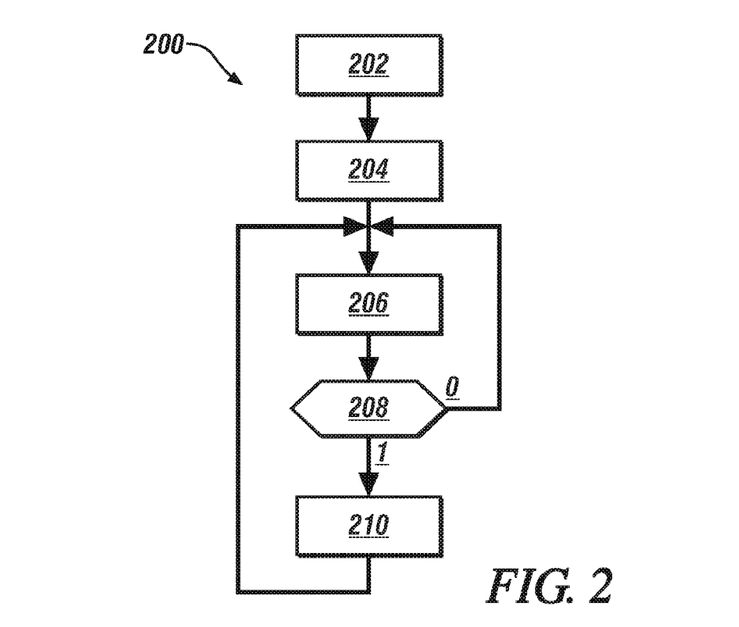
FIG. 2 illustrates a growl avoidance process that can be executed to control operation of a vehicle including a powertrain system that transfers torque to a ground wheel in response to an operator request for creep torque, in accordance with the disclosure.

FIG. 2 schematically shows a growl avoidance process 200 that can be executed to control operation of a vehicle employing a powertrain system including a multi-mode transmission that transfers torque to a ground wheel in response to an operator request for creep torque, including operating in response to an operator-commanded acceleration that is at or near zero and an operator-commanded braking force that is less than a braking force required to maintain the vehicle in a stationary position when the engine is in an ON state and is generating torque.

The growl avoidance process 200 is executed in one or more of the controllers, and includes selecting a magnitude of torque output from one or more of the torque machines in the form of electrical brake torque and a corresponding magnitude of wheel braking providing a mechanical brake torque that reacts input torque from the engine and is responsive to the output torque request. The electrical brake torque, mechanical brake torque and the input torque from the engine are selected to minimize a total power loss through the multi-mode transmission and coincidentally avoid operating the powertrain in an undesirable operating region, which is an input/output torque region associated with objectionable driveline growl. The input/output torque region is defined by a range of input torques from the engine and a corresponding range of output torques of the powertrain. An exemplary objectionable driveline growl region is described with reference to either FIG. 3 or FIG. 4. Table 2 is provided as a key to FIG. 2 wherein the numerically labeled blocks and the corresponding functions are set forth as follows.

TABLE 2

| BLOCK | BLOCK CONTENTS |
| --- | --- |
| 202 | Start |
| 204 | Identify input/output torque region for transmission associated with objectionable driveline growl |
| 206 | Monitor vehicle and powertrain operation<br>PRNDL in one of R, D, L<br>Topr-accel = 0<br>Topr-brake = 0% to 100%<br>Taxle = Topr-accel + Topr-brake<br>Vss<br>Engine ON and generating input torque Te |
| 208 | Conditions Met? |
| 210 | Operator request for creep torque<br>Command Tb to generate To that avoids undesirable operating region in coordination with input torque Te<br>AND<br>Command Tbrake-mech responsive to To to achieve Taxle |

The growl avoidance process 200 is executed during vehicle operation (202). An input/output torque region associated with objectionable driveline growl is identified (204). An input/output torque region associated with objectionable driveline growl is described and illustrated with reference to FIG. 3, and preferably is defined in terms of a range of input torques and a corresponding range of output torques of the transmission.

Operation of the vehicle including the powertrain system is monitored (206) and evaluated to determine whether the powertrain system is operating under conditions which include the input/output torque region associated with objectionable driveline growl (208). Monitored parameters include the operator-commanded acceleration from the accelerator pedal (Topr-accel), the operator-commanded braking from the brake pedal (Topr-brake), the operator-commanded transmission range from the transmission range selector (PRNDL), an engine state, and a present vehicle speed (Vss). A post-mechanical brake axle torque (Taxle) is determined as an arithmetic sum of the operator-commanded acceleration from the accelerator pedal and the operator-commanded braking from the brake pedal (Topr-accel+Topr-brake).

States of the monitored parameters associated with objectionable driveline growl can correspond to an operator request for creep torque, and include the operator-commanded acceleration (Topr-accel) at or near 0%, the operator-commanded braking (Topr-brake) between 0% and 100% of a maximum braking force, an engine state of ON and generating torque, operation in one of the operator-commanded transmission ranges that is associated with effecting vehicle propulsion, i.e., either a forward (D, L) or a reverse (R) gear range, and preferably a present vehicle speed that is less than a maximum vehicle speed imposed under a vehicle creep condition, e.g., less than 8 km/h (5 MPH). It is appreciated that when the operator-commanded acceleration (Topr-accel) is at or near 0%, the commanded acceleration is a non-zero minimum creep/coast acceleration torque command that is determined in relation to vehicle speed that permits the vehicle to coast at higher speeds and to creep at lower speeds. The control scheme interprets a combination of an operator-commanded acceleration at or near 0% and an operator-commanded braking force between 0% and 100% of a maximum braking force when the present vehicle speed is less than the maximum vehicle speed imposed under a vehicle creep condition, e.g., less than 8 km/h (5 MPH) as an operator request for creep torque that can result in objectionable driveline growl. Additional or other conditions under which objectionable driveline growl may be encountered can be employed without limitation.

If all the conditions under which objectionable driveline growl may be encountered are not met (208)(0), no further action is taken with regard to growl avoidance. Operation of the vehicle including the powertrain system continues to be monitored (206).

When the powertrain system is operating under conditions under which objectionable driveline growl may be encountered (208)(1), the control scheme determines preferred control parameters that include operational controls that avoid operating the transmission at input torque and output torque operating points that are within the input/output torque region associated with driveline growl while responding to the operator request for creep torque (210). This includes selecting a magnitude of output torque at the output member of the transmission that induces an electrical brake torque in the driveline (To-brk) and selecting a corresponding magnitude of a mechanical brake torque (Tbrake-mech) that, when combined, are responsive to the operator-commanded braking torque (Topr-brake) and achieves a commanded axle torque (Taxle). The magnitude of the electrical brake torque in the driveline through the output member includes an electrically-induced reactive torque from one or both of the first and second torque machines that also reacts the engine or input torque. The electrically-induced reactive torque from one or both of the first and second torque machines that also reacts the engine or input torque is selected to avoid operating the powertrain in the input/output torque region associated with objectionable driveline growl and coincidentally minimizes a total power loss through the multi-mode transmission.

In this manner, the mechanical brakes operate to provide a reaction torque in place of or in conjunction with one of the electrical motors in the multi-mode transmission in response to operator braking effort. This operation modifies the operation of the various elements of the powertrain system in response to the operator request for creep torque. The strategic modification of requested creep torque enables the transmission mechanical components to avoid the objectionable region of operation by inducing a pre-load therein, thus eliminating or reducing objectionable driveline noise and vibration. Significant reduction in engine idle speed and increase in engine torque enables low speed engine charging during idle/creep maneuvers with the brake pedal depressed.

Figure 3:
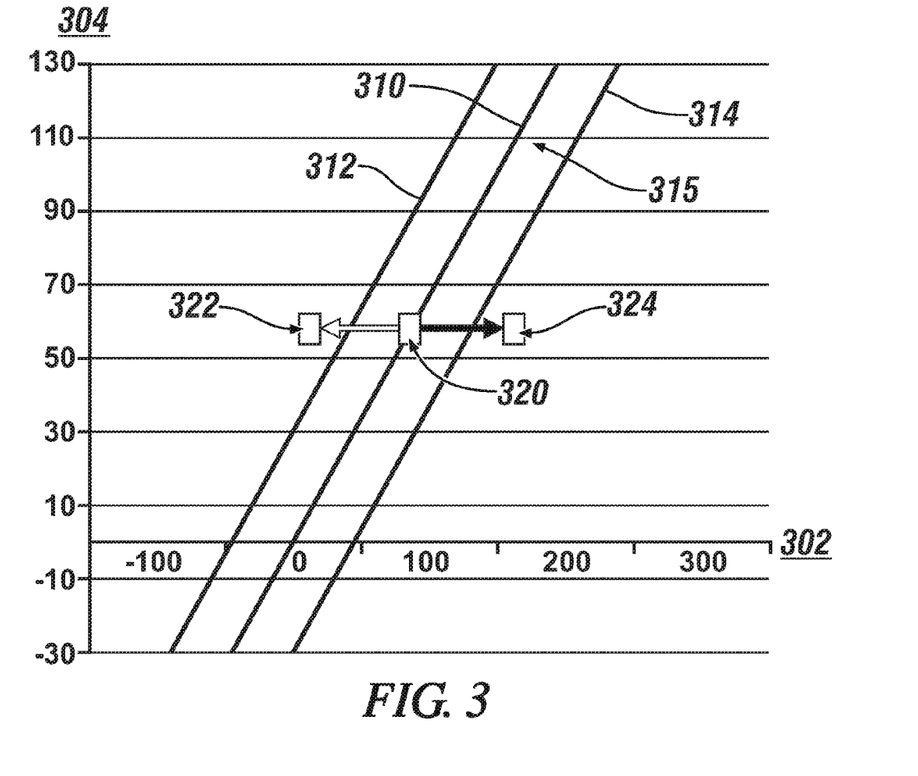
FIGS. 3 and 4 illustrates data from the powertrain of FIG. 1 illustrated upon an engine (input) torque to output torque domain, depicting an input/output torque region associated with driveline growl, in accordance with the disclosure.

FIG. 3 graphically illustrates data from the powertrain of FIG. 1 illustrated upon an engine (input) torque to output torque domain, depicting an input/output torque region wherein objectionable driveline growl may occur in the powertrain system. The operating scenario depicts effecting a magnitude of creep torque that minimizes energy or power loss while avoiding the torque region associated with objectionable driveline growl. Horizontal axis 302 illustrates output torque from the multi-mode transmission 10 and vertical axis 304 illustrates engine torque from engine 12 providing input torque to the multi-mode transmission 10. Line 310 illustrates a condition wherein a motor torque equals zero over a range of engine torques and output torques. Line 312 represents operating points whereat motor torque is −15 Nm from Line 310 over the range of engine torques and output torques. Line 314 represents operating points whereat motor torque is +15 Nm from Line 310 over the range of engine torques and output torques. Region 315 is defined within lines 312 and 314 and represents a transmission input torque/output torque region whereat the multi-mode transmission is susceptible to objectionable driveline growl. As shown, lines 312 and 314 circumscribe region 315 that is within +/−15 Nm of a zero motor torque line over a range of engine torques and output torques for the illustrated multi-mode transmission, and illustrate an objectionable driveline growl region 315 that is defined with reference to measurable operating metrics of the powertrain system, specifically an input torque range and a corresponding output torque range. The objectionable driveline growl region 315 may be specific to a particular powertrain configuration and is preferably developed in an off-line environment by experimentation, simulation, modeling and/or other suitable analytical techniques. The objectionable driveline growl region 315 illustrates a region of powertrain operation that is preferably avoided to prevent the occurrence of growl.

In the example of FIG. 3, an optimal engine torque is defined as 60 Nm, which translates to 90 Nm at the output member due to a 1.5× engine torque multiplication in the transmission. At operating point 1 320, the operator-commanded braking force is 100%, indicating zero vehicle speed. When electrical brake torque, i.e., torque output from the torque machines including motor B, is 0 Nm, the required mechanical brake torque to counteract the output torque is 90 Nm*FD, wherein FD is the final drive ratio through the driveline. At operating point 2, which includes points 322 and 324, the operator fully releases the brake pedal without depressing the accelerator pedal. The operator-commanded braking force is 0% and the operator-commanded acceleration force is 0%, which is interpreted as indicating an operator request for creep torque at the maximum creep torque. As shown, the operator request for maximum creep torque can be 150 Nm. The engine torque multiplication causes the engine to supply 90 Nm to the output member, and the remaining torque is supplied by motor B, which generates 20 Nm with a motor torque multiplication of 3× to achieve a total output torque to the driveline of 90 Nm+60 Nm=150 Nm. The powertrain system thus minimizes energy loss while operating at creep torque, and may further avoid operating in an objectionable driveline growl region.

Figure 4:
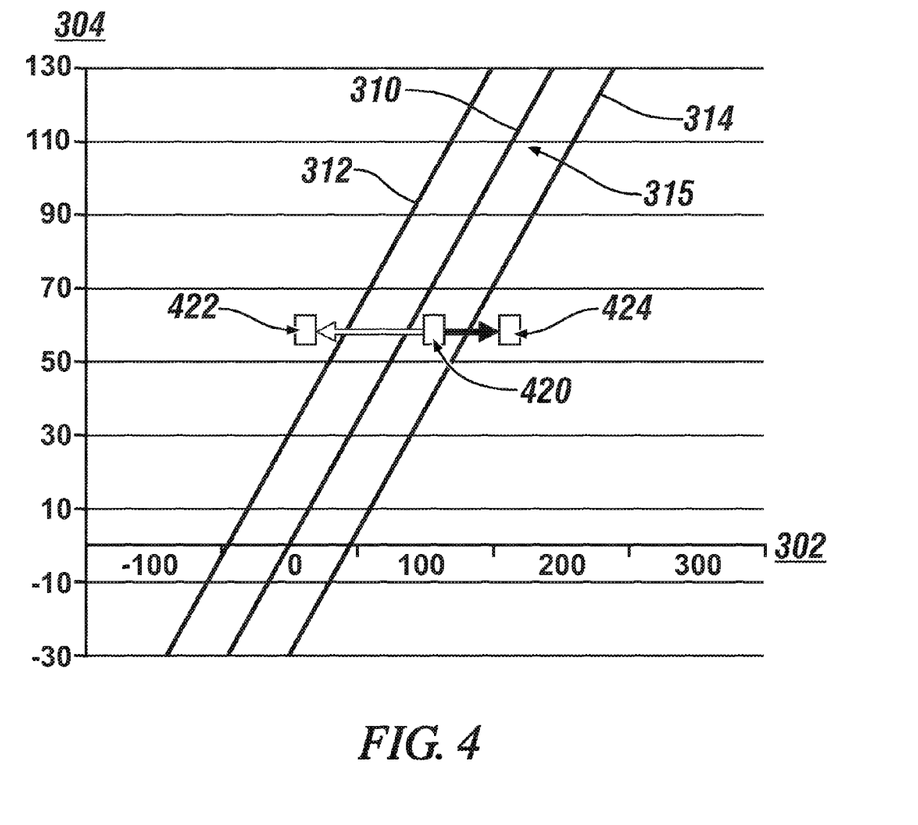

FIG. 4 illustrates data that is analogous to the data of FIG. 3 from the powertrain of FIG. 1 illustrated upon an engine (input) torque to output torque domain, depicting an input/output torque region wherein objectionable driveline growl may occur in the powertrain system. The operating scenario depicts effecting a magnitude of creep torque that avoids the torque region associated with objectionable driveline growl. Horizontal axis 302 illustrates output torque from the multi-mode transmission 10 and vertical axis 304 illustrates engine torque from the engine 12 providing input torque to the multi-mode transmission 10. Line 310 illustrates a condition wherein a motor torque equals zero over a range of engine torques and output torques. Line 312 represents operating points whereat motor torque is −15 Nm from Line 310 over the range of engine torques and output torques. Line 314 represents operating points whereat motor torque is +15 Nm from Line 310 over the range of engine torques and output torques. Objectionable driveline growl region 315 is defined within lines 312 and 314 and represents a transmission input torque/output torque region whereat the multi-mode transmission is susceptible to objectionable driveline growl. As shown, lines 312 and 314 circumscribe region 315 that is within +/−15 Nm of a zero motor torque line over a range of engine torques and output torques for the illustrated multi-mode transmission, and illustrate an objectionable driveline growl region 315 that is defined with reference to measurable operating metrics of the powertrain system, specifically an input torque range and a corresponding output torque range. The objectionable driveline growl region 315 may be specific to a particular powertrain configuration and is preferably developed in an off-line environment by experimentation, simulation, modeling and/or other suitable analytical techniques. The objectionable driveline growl region 315 illustrates a region of powertrain operation that is preferably avoided to prevent the occurrence of growl.

In the example shown with reference to FIG. 4, an optimal engine torque is defined as 60 Nm, which translates to 90 Nm at the output member due to a 1.5× engine torque multiplication in the transmission. At operating point 1 420, the operator-commanded braking force is 100%, indicating zero vehicle speed. The electrical brake torque, i.e., torque output from the torque machines including motor B, is 15 Nm, which translates to 45 Nm at the output member due to a 3× motor torque multiplication in the transmission. Operating motor B at 15 Nm torque avoids present powertrain operation in the objectionable driveline growl region 315. Under the present condition, the required mechanical brake torque to counteract the output torque is 90 Nm (engine)−45 Nm=45 Nm×FD, wherein FD is the final drive ratio through the driveline. At operating point 2, which includes points 422 and 424, the operator fully releases the brake pedal without depressing the accelerator pedal. The operator-commanded braking force is 0% and the operator-commanded acceleration force is 0%, which is interpreted as indicating an operator request for creep torque at the maximum creep torque. As shown, the operator request for maximum creep torque can be 150 Nm. The mechanical brake torque is 0 Nm, the engine torque is 90 Nm to the output member, and the remaining torque is supplied by motor B, which generates 20 Nm with a motor torque multiplication of 3× to achieve a total output torque to the driveline of 90 Nm+60 Nm=150 Nm. The powertrain system avoids operating in objectionable driveline growl region throughout the process, and the electric energy consumed when the operator-commanded braking force is 100% is less than that which would have occurred had the torque machine, i.e., motor B, been employed to generate all the torque reactive to the engine torque under the conditions. This permits a trade-off between power loss and objectionable driveline growl.

Objectionable driveline growl can be generated at various locations within a powertrain. Each of the locations can exhibit different regions conducive to growl. The methods disclosed herein can be used to simultaneously avoid growl in each of the different locations. In one example, penalties in a control routine can be assigned to operate in any of the regions conducive to growl, such that control of the powertrain is restrained from entering any of the regions wherein growl is enabled. Transitions are disclosed herein to move from one powertrain operating point to another while avoiding a powertrain operating region wherein growl is enabled. Sometimes fast transitions in the operation of the engine can facilitate a smooth transition or aid in avoiding the regions wherein growl is enabled. Under some conditions, engine air or spark torque and engine speed can be used to quickly control the engine.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a vehicle including an internal combustion engine coupled to an input member of a multi-mode transmission configured to transfer torque to an output member coupled to a ground wheel with the internal combustion engine in an ON state generating an input torque, the method comprising:
   identifying an operating region comprising an input/output torque region for operating the multi-mode transmission; and
   in response to an operator request for creep torque, controlling motor torque from a torque machine coupled to the multi-mode transmission such that the multi-mode transmission is operating outside the identified operating region and coincidently controlling a mechanical braking torque to the ground wheel in response to an operator-commanded braking, the input torque from the engine, and the motor torque from the torque machine.

2. The method of claim 1, wherein controlling the mechanical braking torque to the ground wheel comprises controlling the mechanical braking torque to the ground wheel in response to the input torque from the engine and the motor torque from the torque machine when the operator-commanded braking is 100%.

3. The method of claim 1, wherein controlling the mechanical braking torque to the ground wheel comprises controlling the mechanical braking torque to the ground wheel at a zero torque and controlling the input torque from the engine and the motor torque from the torque machine in response to a predetermined creep torque when the operator-commanded braking is 0%.

4. The method of claim 3, wherein controlling the input torque from the engine and the motor torque from the torque machine comprises controlling the input torque from the engine and the motor torque from the torque machine to achieve an output torque of the multi-mode transmission that achieves a predetermined maximum vehicle ground speed on a level road surface.

5. The method of claim 1, wherein the operator request for creep torque comprises an operator-commanded acceleration near zero and a vehicle speed that is less than a maximum vehicle creep speed at an operator-commanded transmission range associated with effecting vehicle propulsion.

6. The method of claim 1, wherein said input/output torque region is associated with driveline growl.

7. A method for controlling a vehicle including an internal combustion engine coupled to an input member of a multi-mode transmission configured to transfer torque to an output member coupled to a ground wheel, comprising:
   identifying an input/output torque region for the multi-mode transmission associated with driveline growl; and
   in response to operator-commanded braking with the internal combustion engine in an ON state generating an input torque with the vehicle operating at a vehicle speed that is less than a maximum vehicle creep speed, controlling motor torque from a torque machine coupled to the multi-mode transmission to generate an output torque of the multi-mode transmission such that the multi-mode transmission is operating outside of said input/output torque region and coincidently controlling a mechanical braking torque to the ground wheel in response to the operator-commanded braking and the output torque of the multi-mode transmission.

8. The method of claim 7, wherein controlling the mechanical braking torque to the ground wheel comprises controlling the mechanical braking torque to the ground wheel greater than or equal to the output torque of the multi-mode transmission multiplied by a final drive ratio when the operator-commanded braking is 100%.

9. The method of claim 7, wherein controlling the mechanical braking torque to the ground wheel comprises controlling the mechanical braking torque to the ground wheel at a zero torque and controlling the output torque of the multi-mode transmission responsive to a predetermined creep torque when the operator-commanded braking is 0%.

10. The method of claim 9, wherein controlling the output torque of the multi-mode transmission comprises controlling the output torque of the multi-mode transmission to achieve a predetermined maximum vehicle ground speed on a level road surface.

11. The method of claim 7, wherein said controlling motor torque output of the torque machine and said controlling mechanical braking torque to the ground wheel is effected when an operator-commanded transmission range input from a range selector comprises a propulsion torque range.

12. A method for controlling a vehicle including an internal combustion engine coupled to an input member of a multi-mode transmission configured to transfer torque to an output member coupled to a ground wheel with the internal combustion engine in an ON state generating an input torque, the method comprising:
   identifying an operating region comprising an input/output torque region for operating the multi-mode transmission that is associated with driveline growl; and
   in response to an operator request for creep torque, controlling motor torque from a torque machine coupled to the multi-mode transmission such that the multi-mode transmission is operating outside the identified operating region and controlling a mechanical braking torque to the ground wheel responsive to an operator-commanded braking, the input torque from the engine, and the motor torque from the torque machine.

* * * * *